US011138415B2

(12) United States Patent
Fisher et al.

(10) Patent No.: US 11,138,415 B2
(45) Date of Patent: Oct. 5, 2021

(54) SMART VISION SENSOR SYSTEM AND METHOD

(71) Applicant: Shepherd AI, LLC, San Juan, PR (US)

(72) Inventors: Charles Fisher, San Juan, PR (US); Darren Odom, Longmont, CO (US)

(73) Assignee: Shepherd AI, LLC, San Juan, PR (US)

( * ) Notice: Subject to any disclaimer, the term of this patent is extended or adjusted under 35 U.S.C. 154(b) by 0 days.

(21) Appl. No.: 16/577,444

(22) Filed: Sep. 20, 2019

(65) Prior Publication Data
US 2020/0097706 A1 Mar. 26, 2020

Related U.S. Application Data

(60) Provisional application No. 62/733,912, filed on Sep. 20, 2018.

(51) Int. Cl.
G06K 9/00 (2006.01)
H04N 5/225 (2006.01)
G06N 5/04 (2006.01)
H04N 7/18 (2006.01)
G08B 23/00 (2006.01)
G08B 13/19 (2006.01)
G08B 13/196 (2006.01)

(52) U.S. Cl.
CPC ..... *G06K 9/00335* (2013.01); *G06K 9/00771* (2013.01); *G06N 5/04* (2013.01); *G08B 23/00* (2013.01); *H04N 5/2252* (2013.01); *H04N 5/2256* (2013.01); *H04N 7/183* (2013.01)

(58) Field of Classification Search
CPC .......... G06K 9/00335; G06K 9/00771; G06K 9/00362; G06K 9/00342; G06K 9/00355; G06N 5/04; G08B 23/00; H04N 5/2252; H04N 5/2256; H04N 7/183
See application file for complete search history.

(56) References Cited

U.S. PATENT DOCUMENTS

| 9,007,301 | B1* | 4/2015 | Raffle | G02B 27/017 345/156 |
| 2002/0137218 | A1* | 9/2002 | Mian | B01F 13/00 436/45 |
| 2004/0113933 | A1* | 6/2004 | Guler | G06K 9/32 715/716 |
| 2005/0232487 | A1* | 10/2005 | Fleisher | G01V 8/005 382/181 |
| 2008/0169929 | A1* | 7/2008 | Albertson | G08B 13/19613 340/573.1 |

(Continued)

Primary Examiner — Alexander Gee
(74) Attorney, Agent, or Firm — Buchanan Ingersoll & Rooney PC

(57) ABSTRACT

The system includes a detection unit configured to obtain sensor data of an environment (e.g., a massage therapy facility, a doctor's office, etc.), where the sensor data relates to the movements and actions of a first individual (e.g., a practitioner) and/or a second individual (e.g., the practitioner's patent) in relation to each other. The system is used to monitor the actions of the individuals so as to detect inappropriate behavior by the first individual and/or the second individual (e.g., inappropriate touching or hand placement, groping, etc.). The system can be configured to detect inappropriate behavior without capturing personally identifying images and/or videos of the individuals.

16 Claims, 16 Drawing Sheets

(56) References Cited

U.S. PATENT DOCUMENTS

| | | | |
|---|---|---|---|
| 2011/0169646 A1* | 7/2011 | Raichman | G08B 21/245 340/573.1 |
| 2015/0341139 A1* | 11/2015 | Bradley | H04K 3/62 348/143 |
| 2017/0126710 A1* | 5/2017 | De-Levie | G06F 16/24575 |

* cited by examiner

SMART VISION SENSOR SYSTEM AND METHOD

CROSS-REFERENCE TO RELATED APPLICATIONS

This patent application is related to and claims the benefit of U.S. Provisional Patent Application 62/733,912 entitled "Smart Vision Sensor System and Method", filed on Sep. 20, 2018, the entire contents of which are hereby incorporated by reference herein in their entirety.

FIELD OF THE INVENTION

Embodiments relate to a system having a detection unit configured to receive information about individuals in an environment and determine if inappropriate behavior is occurring without capturing personally identifiable information about the individuals.

BACKGROUND OF THE INVENTION

Conventional surveillance systems use sensors and cameras are designed to capture personally identifiable information about individuals being surveillanced. This can present a problem when surveillance is desired in situations in which the persons being surveillanced have a reasonable expectation of privacy (e.g., they expect to not be identified or not having personal information or personal attributes about them being recorded). In addition, conventional surveillance systems are not able to detect behaviors that may be deemed inappropriate or objectionable (e.g., sexual harassment, sexual assault, or other misconduct).

The present invention is designed to overcome at least one of the above identified problems.

BRIEF SUMMARY OF THE INVENTION

Embodiments of the system include a detection unit configured to obtain sensor data of an environment (e.g., a massage therapy facility, a doctor's office, etc.). The system collects sensor data related to the movements and actions of a first individual (e.g., a practitioner) and/or a second individual (e.g., the practitioner's patent) in relation to each other. As a non-limiting example, the system can be used to monitor the actions of a massage therapist so as to detect inappropriate behavior by the massage therapist (e.g., inappropriate touching or hand placement, groping, etc.) in relation to the massage patient. The system can be configured to detect inappropriate behavior without capturing personally identifying images and/or videos of the massage therapist and/or patient. The system can also provide additional information beyond monitoring for inappropriate behavior. This additional information includes the proper positioning of a patient during the massage, proper hand placement and massage techniques used by the massage therapist to treat a specific condition, the quality of the massage, etc.

In at least one embodiment, a detection unit includes an illuminator configured to generate first electromagnetic radiation within the infrared spectrum and project the first electromagnetic radiation onto at least one object and/or at least one individual within an environment. The detection unit includes a sensor configured to: receive the first electromagnetic radiation reflected from the at least one object and/or the at least one individual; receive second electromagnetic radiation, the second electromagnetic radiation being emitted from the at least one object and/or the at least one individual; generate sensor data from the received first electromagnetic radiation and received second electromagnetic radiation. detection unit includes a processor configured to: receive the sensor data and generate a depth perception model of the environment; generate event data and gesture data to track location, orientation, and movement of the at least one object and/or the at least one individual; identify a behavior based on the event data and the gesture data; compare the behavior to a behavior model; generate an inference, via artificial intelligence techniques, to categorize the behavior, identify at least one inference as an event; and generate metadata and associate the metadata to the event, the metadata being a time-stamped transcription of the event.

In some embodiments, the processor configures the metadata to exclude from the transcription any information that personally identifies the at least one individual.

In some embodiments, the processor categorizes the behavior as: appropriate behavior defined as the inference of behavior, as a whole, falling within the behavior model; objectionable behavior defined as the inference of behavior, as a whole, falling within the behavior model but having some gesture data that falls outside of the behavior model; or inappropriate behavior defined as the inference of behavior, as a whole, falling outside of the behavior model.

In some embodiments, the processor is configured to generate an alert for objectionable behavior and an alert for inappropriate behavior.

In some embodiments, the alert for objectionable behavior comprises a communication transmitted by the processor and the alert for inappropriate behavior comprises a communication transmitted by the processor.

In some embodiments, the processor is configured to generate a distinct record of event for objectionable behavior and a distinct record of event for inappropriate behavior.

In some embodiments, the processor is configured to generate additional information related to the appropriate behavior.

In some embodiments, the at least one individual comprises a first individual and a second individual.

In some embodiments, the processor, via the depth perception model of the environment: identifies a feature of the first individual and tags the feature of the first individual as being associated with the first individual; and identifies a feature of the second individual and tags the feature of the second individual as being associated with the second individual.

In some embodiments, the feature of the first individual comprises at least one of a hand, an arm, a leg, a stomach, a chest, a back, a buttock, and a face; and the feature of the second individual comprises at least one of a hand, an arm, a leg, a stomach, a chest, a back, a buttock, and a face.

In some embodiments, the feature of the first individual comprises a first hot zone defined as a sensitive area of the first individual's body; and the feature of the second individual comprises a second hot zone defined as a sensitive area of the second individual's body.

In some embodiments, the processor categorizes the behavior as: appropriate behavior defined as: the inference of behavior, as a whole, falling within the behavior model; and the gesture data having no indication of the first hot zone and/or the second hot zone being entered by another feature of the first individual and/or the second individual; objectionable behavior defined as: the inference of behavior, as a whole, falling within the behavior model but having some gesture data that falls outside of the behavior model; and the gesture data having an indication of the first hot zone and/or the second hot zone being entered by another feature of the first individual and/or the second individual; or inappropriate behavior defined as: the inference of behavior, as a whole, falling outside of the behavior model; and the gesture data having an indication of the first hot zone and/or the second hot zone being entered by another feature of the first individual and/or the second individual.

In some embodiments, the detection unit comprises a casing configured to house the illuminator, the sensor, and the processor.

In some embodiments, the casing comprises a casing front, casing sides, and a casing rear; the casing has a disc or puck shape; and the casing front has an optical window configured to allow for transmission of the first electromagnetic radiation and the second electromagnetic radiation, but to block at least some electromagnetic radiation outside of the infrared spectrum.

In some embodiments, the sensor comprises an infrared camera.

In some embodiments, the sensor comprises a plurality of sensors.

In at least one embodiment, a surveillance system includes a detection unit, comprising: an illuminator configured to generate first electromagnetic radiation within the infrared spectrum and project the first electromagnetic radiation onto at least one object and/or at least one individual within an environment; a sensor configured to: receive the first electromagnetic radiation reflected from the at least one object and/or the at least one individual; receive second electromagnetic radiation, the second electromagnetic radiation being emitted from the at least one object and/or the at least one individual; generate sensor data from the received first electromagnetic radiation and received second electromagnetic radiation; a processor configured to: receive the sensor data and generate a depth perception model of the environment; generate event data and gesture data to track location, orientation, and movement of the at least one object and/or the at least one individual; identify a behavior based on the event data and the gesture data; compare the behavior to a behavior model; generate an inference, via artificial intelligence techniques, to categorize the behavior; identify at least one inference as an event; generate metadata and associate the metadata to the event, the metadata being a time-stamped transcription of the event; generate an alert based on the categorized behavior. The surveillance system includes a computer device configured to receive the metadata and the alert.

In some embodiments, the detection unit is part of a first communications network and the computer device is part of a second communications network.

In some embodiments, the detection unit comprises a plurality of detection units and the computer device comprises a plurality of computer devices.

In at least one embodiment, a method for surveillance involves generating first electromagnetic radiation within the infrared spectrum and projecting the first electromagnetic radiation onto at least one object and/or at least one individual within an environment. The method involves receiving the first electromagnetic radiation reflected from the at least one object and/or the at least one individual. The method involves receiving second electromagnetic radiation, the second electromagnetic radiation being emitted from the at least one object and/or the at least one individual. The method involves generating environment data from the received first electromagnetic radiation and received second electromagnetic radiation. The method involves generating a depth perception model of the environment based on the environment data. The method involves generating event data and gesture data to track location, orientation, and movement of the at least one object and/or the at least one individual. The method involves identifying a behavior based on the event data and the gesture data. The method involves comparing the behavior to a behavior model. The method involves generating an inference to categorize the behavior. The method involves identifying at least one inference as an event. The method involves generating metadata and associating the metadata to the event, the metadata being a time-stamped transcription of the event.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages and possible applications of the present invention will be more apparent from the following more particular description thereof, presented in conjunction with the following drawings, in which.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
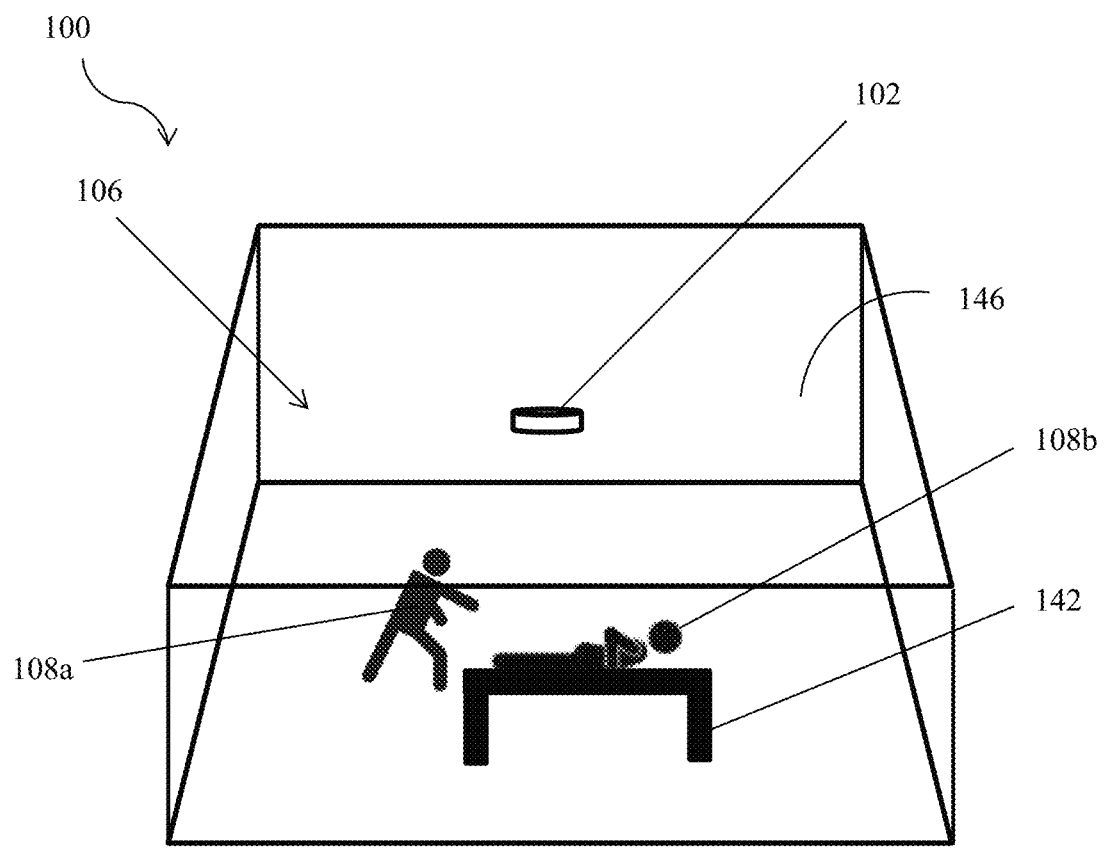
FIG. 1 shows an exemplary use of an embodiment of the system in a massage therapy room.
Figure 2:
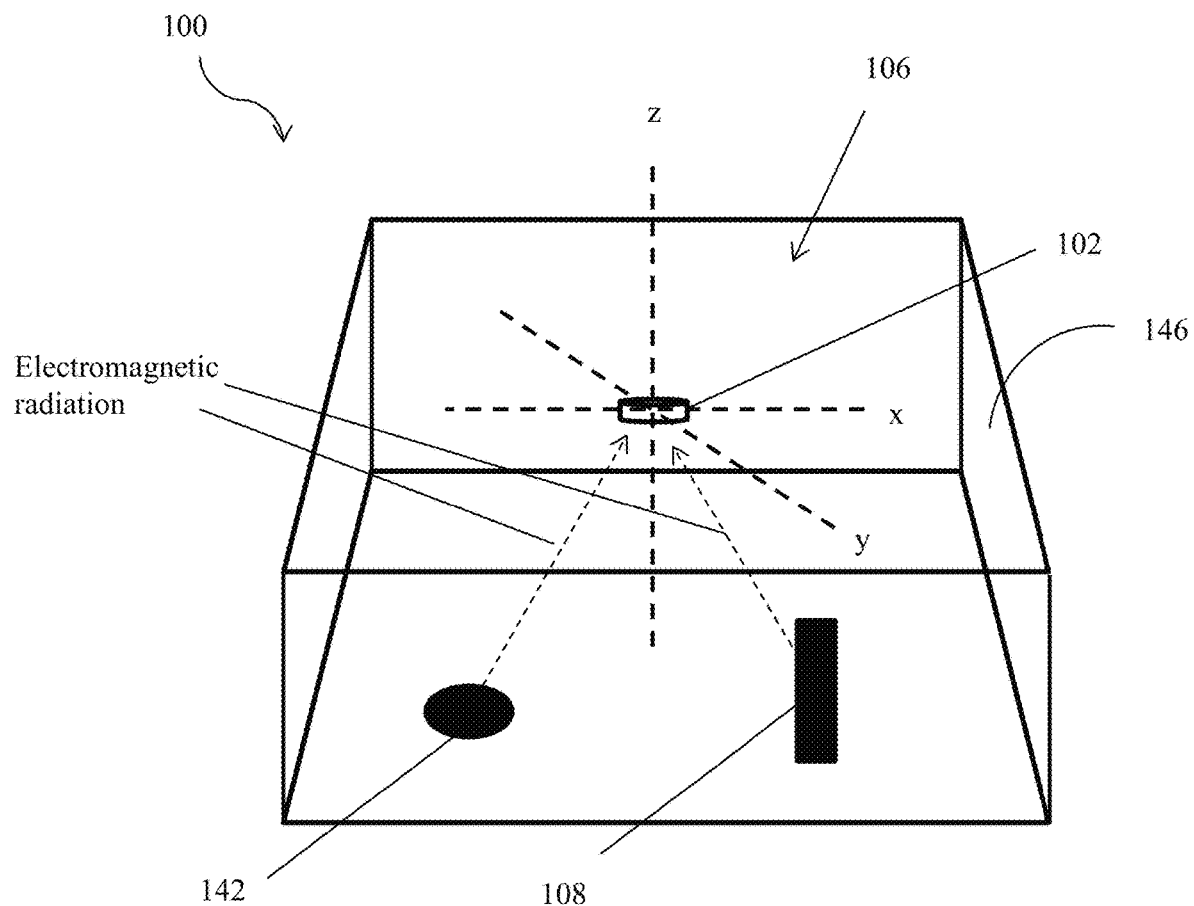
FIG. 2 shows another exemplary use of an embodiment of the system in a massage therapy room.
Figure 3:
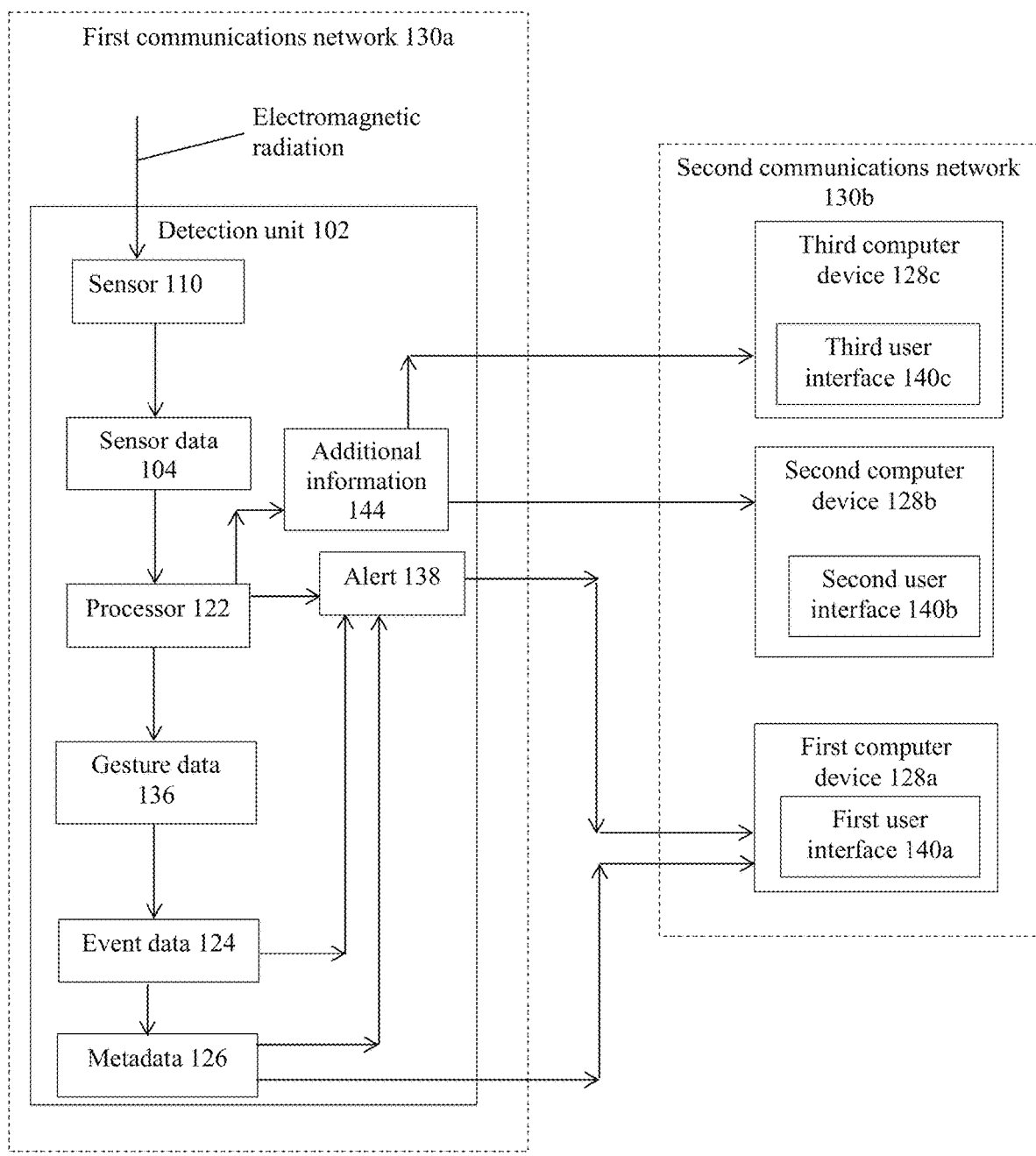
FIG. 3 is an exemplary system architecture that can be used for an embodiment of the system.

Referring to FIGS. 1-3, embodiments of the system 100 include a detection unit 102 configured to obtain sensor data 104 of an environment 106. The environment 106 can include a volume of space in which it is anticipated for an individual 108 to perform activities. For example, the environment 106 can be a room, a workspace, an area of operation, etc. It is contemplated for the system 100 to collect sensor data 104 related to the movements and actions of a first individual 108a (e.g., a practitioner) and/or a second individual 108b (e.g., the practitioner's patent) in relation to each other. As a non-limiting example, the system 100 can be used to monitor the actions of a massage therapist 108a so as to detect inappropriate behavior by the massage therapist 108a (e.g., inappropriate touching or hand placement, groping, etc.) in relation to the patient 108b. In addition, the system 100 can be used to provide a defense to a massage therapist 108a who has been wrongfully accused of such misconduct. In this regard, the system 100 may serve as a chaperone to provide an account of events to be relied upon as a safeguard for a practitioner 108a and/or a patient 108b.

The system 100 can be configured to detect inappropriate behavior without capturing identifying images and/or videos of the massage therapist 108a and/or patient 108b. Thus, the system 100 can effectively detect and record enough information about the situation to provide an accurate account of events, but without violating privacy concerns (e.g., legal regulations governing recording identifying images and/or videos of persons having a reasonable expectation of privacy, personal concerns of practitioners 108a and patients 108b being recorded, etc.). In addition to detecting and recording information to act as a chaperone, the system 100 can be configured to generate additional information 144 used to provide feedback to a user regarding the practitioner's 108a performance. This additional information 144 is information beyond monitoring for inappropriate behavior. Some additional information 144 can include the proper positioning of a patient 108b during the massage, proper hand placement and massage techniques used by the massage therapist 108a to treat a specific condition, the quality of the massage, etc.

While various embodiments disclose use of the system 100 to obtain sensor data 104 of an environment 106 that is a massage room used by a massage therapist 108a, the system 100 can be used in other environments 106. These can be a medical examination room, an operating room, a dental hygienist room, a school detention room, a police detention room, etc.

The detection unit 102 is a device configured to receive sensor data 104 through at least one sensor 110. The sensor 110 can be a camera, temperature sensor, pressure sensors, light sensor, LIDAR unit, RADAR unit, etc. The sensor data 104 is data representative of a condition (e.g., temperature, radiation being emitted from objects 142, etc.) of the environment 106. In at least one embodiment, the detection unit 102 includes a sensor 110 that is an infrared camera. The infrared camera is a device configured to receive and detect electromagnetic radiation within the infrared spectrum, which includes receiving and detecting electromagnetic radiation having wavelengths within the range from 700 nm to 1 mm. For example, the infrared camera can be an apparatus having a charged coupled device, a photo-array unit, etc. configured to generate an electric current based on the wavelength of electromagnetic radiation received. The camera can be further configured to detect the intensity of the electromagnetic radiation received, and modify the electric current based on the intensity. By generating electric current as a function of the wavelength and intensity of electromagnetic radiation received, the detection unit 102 can generate a heat signature of objects 142 within the environment 106 based on the electromagnetic radiation emitted therefrom. The camera can have other optical components, such as lenses, waveguides, prisms, beam splitters, etc. to facilitate directing, filtering, and processing the received electromagnetic radiation. It should be noted that the detection unit 102 can have more than one sensor 110, which can include any one or combination of sensor types. For example, the detection unit 102 can have two or more infrared cameras 110. In one embodiment, the infrared camera operates at or near 850 nm. Operating at 850 nm can facilitate operability (e.g., allow for adequate and accurate data acquisition from the sensors 110) of the system 100 regardless of the level or intensity of ambient light in the room 106.

In one embodiment, the camera has an ultra wide-angle lens (i.e., a fisheye lens) configured to receive electromagnetic radiation from a wide panoramic or hemispherical field of view of the environment 106. This can facilitate generating a wide panoramic representation of the environment 106. In other words, the camera can be configured to obtain electromagnetic radiation from the entire environment 106 even though the camera is a small inconspicuous unit. For example, the detection unit 102 can be placed at a center point on the ceiling 146 of a room 106. A single camera with an ultra wide-angle lens may be able to receive electromagnetic radiation from the entire room 106 due to the panoramic or hemispherical field of view provided by the lens. As another example, the detection unit 102 can have two cameras, each able to provide a panoramic or hemispherical field of view of a side of the room 106. The data received by each camera would then be compiled to generate a representation of the entire room 106.

It is contemplated for the sensor 110 to collect sensor data 104 that is non-identifiable to the individuals 108 in the environment 106. In this regard, the sensor 110 is configured to not be able to receive information that can be used to identify an individual 108 or acquisition any personal information about an individual 108 (so as to be able to identify that individual, capture an image of a physical attribute of that individual, etc.). For example, while the infrared camera may be used to generate an image of the individuals 108 in the environment 106, the physical features of the individuals 108 would be too amorphous to identify any of the people or to identify physical attributes of the people.

While safeguards can be in place to ensure that sensor data 104 does not collect personally identifiable information, it will be understood that embodiments of the system 100 can be configured to collect personally identifiable information. For example, any one or combination of the sensors 110 can be a camera that operates in the visible light spectrum.

The system 100 can be configured to use more than one type of sensor 110. For example, pressure sensors, position sensors, vibration sensors, etc. can be used in addition to or in the alternative to the infrared camera sensor. Any one or combination of the sensors 110 can be part of or be separate from the detection unit 102. For instance, the detection unit 102 (being attached to the ceiling 146 of the room 106, for example) can have an infrared camera sensor 110, whereas pressure sensors 110 are placed on the floor of the room 106.

It should be noted that the system 100 has a modular architecture. This can allow the system 100 to be modified by adding more or less sensors 110. In some embodiments, the system 100 can be tied into existing sensors 110 or monitoring systems. For instance, the pressure sensors 110 on the floor discussed above may be existing sensors that are already in use, and the system 100 can use the data from these pressure sensors to augment the data generated from the detection unit 102.

Figure 4:
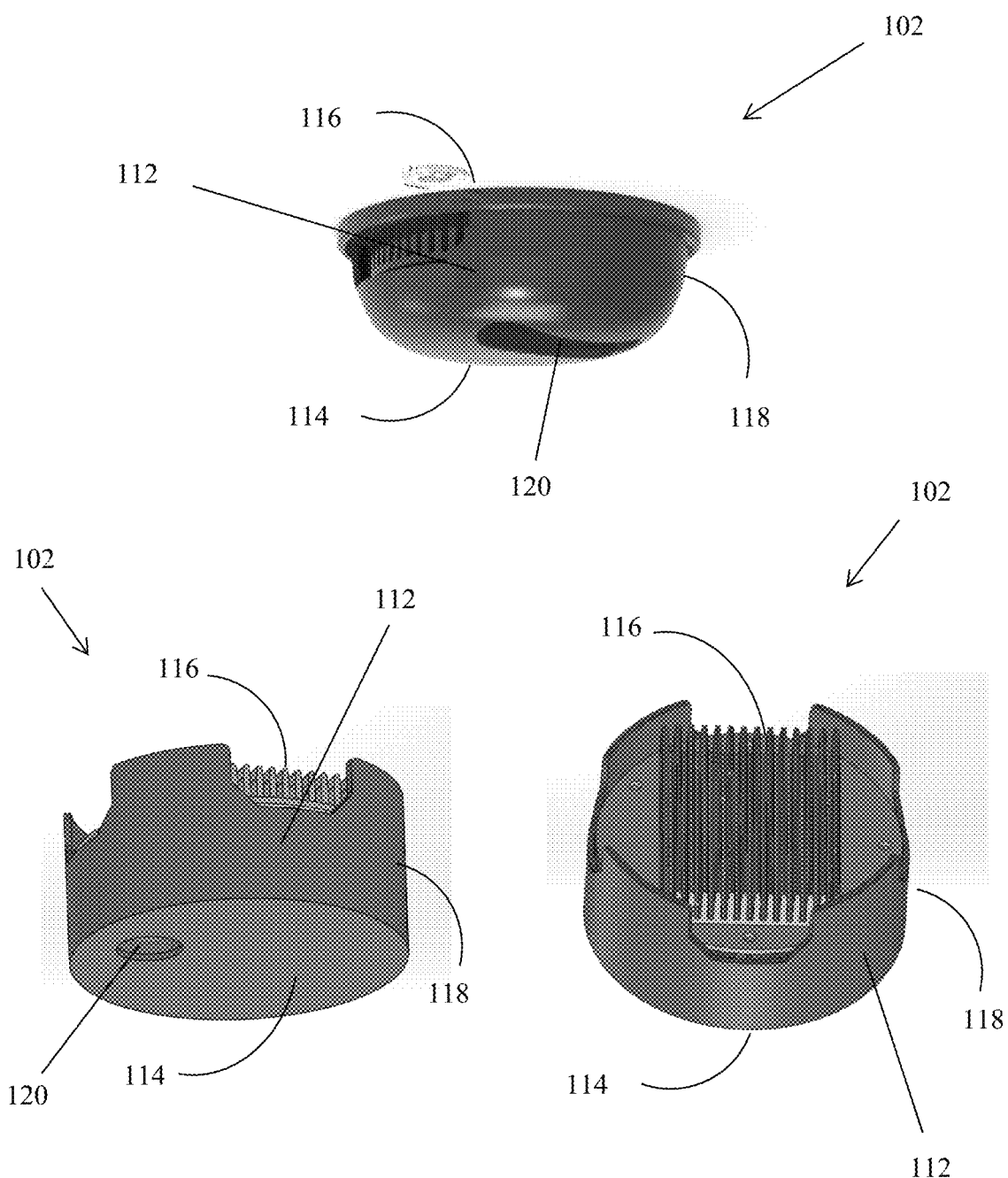
FIG. 4 shows exemplary embodiments of a detection unit that can be used with an embodiment of the system.
Figure 5:
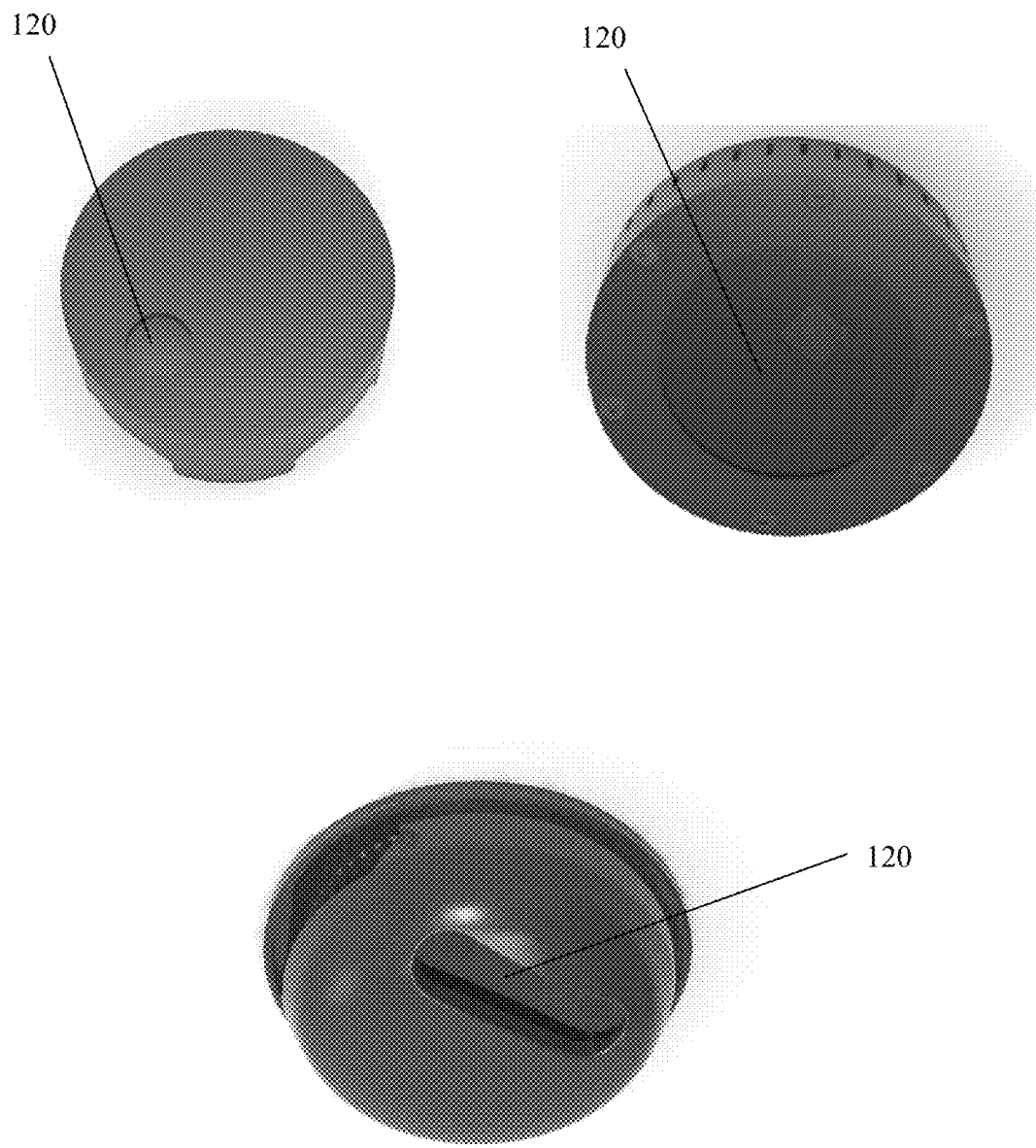
FIG. 5 shows exemplary embodiments of optical windows that can be used with an embodiment of the detection unit.
Figure 6:
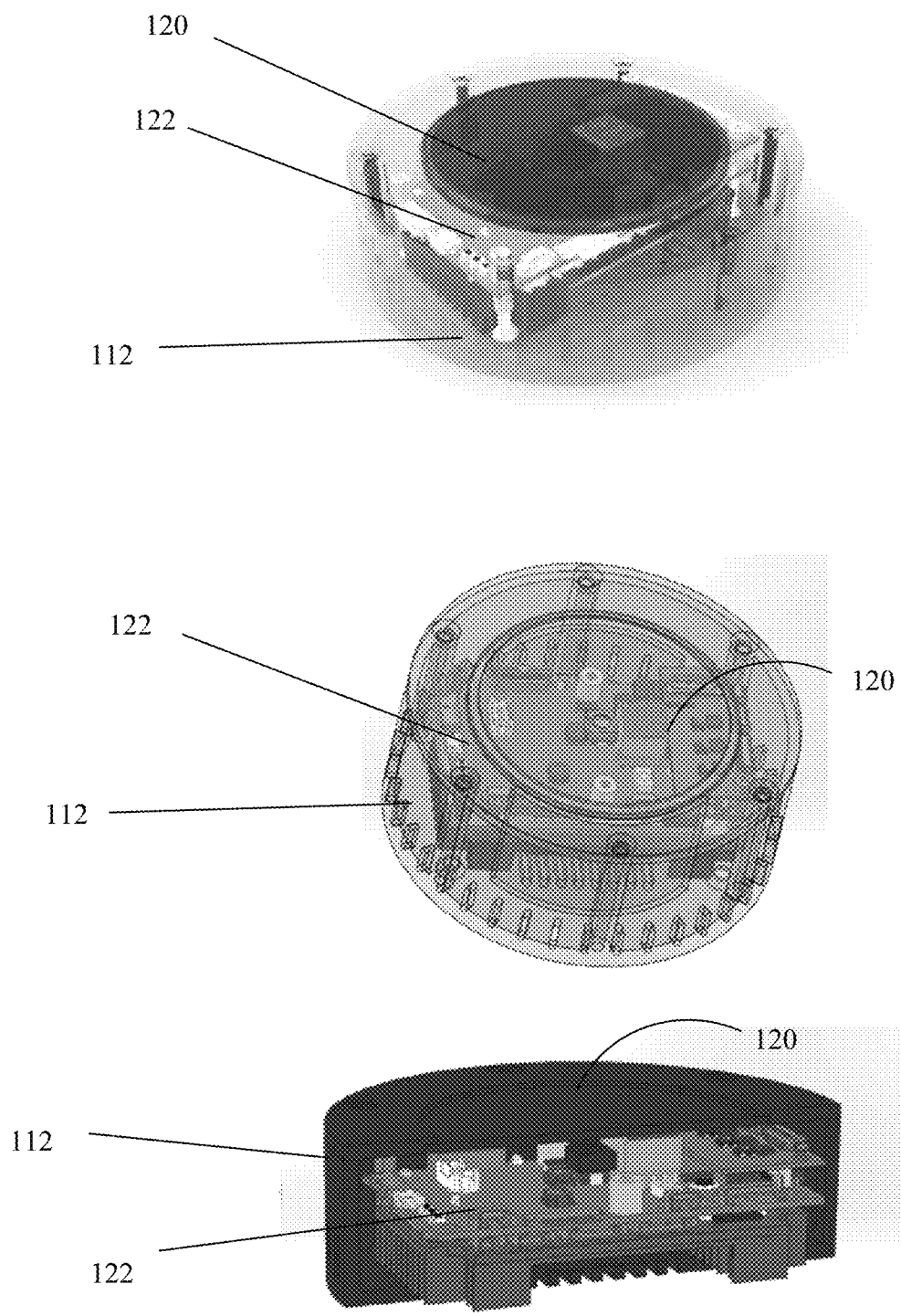
FIG. 6 shows exemplary embodiments of the detection unit, illustrating layered views of the exemplary components that can be used in embodiments of the detection unit.

Referring to FIGS. 4-6, the detection unit 102 has a casing 112 that houses the sensor(s) 110 and other components of the detection unit 102. The casing 112 can be made from a rigid material such as plastic, metal, ceramic, glass, etc. The casing 112 can be made into a shape. This can be square, cylindrical, rectangular, circular, etc. It is contemplated for the casing 112 to have a puck or disc-like shape. It is further contemplated for the casing 112 to not resemble a camera unit. For example, the detection unit 102 can be in the shape of a puck with a 4-inch diameter and a low profile (2-inch to 4-inch height). This can be done to avoid the perception that the individuals 108 in the environment 106 are being recorded. In other words, the casing 112 of the detection unit 102 can be configured to be inconspicuous as to its operation.

The casing 112 has a casing front 114, casing sides 118, and a casing rear 116. The casing rear 116 is configured to facilitate attachment of the detection unit 102 to an ancillary object 142 (e.g., a wall or ceiling 146). The casing 112 has an optical window 120. The optical window 120 is an area in which electromagnetic radiation of the environment 106 enters through the casing 112 and is detected by the sensor 110. The optical window 120 can be an opening, a lens, a filter, etc. formed in or disposed on a portion of the casing 112. It is contemplated for the detection unit 102 to be attached to the ceiling 146 of a room 106 and for the optical window 120 to be formed in the casing front 114. In one embodiment, the optical window 120 is a filter (e.g., a dichroic mirror) configured to pass infrared electromagnetic radiation but block other electromagnetic radiation. For example, the optical window 120 can be configured to pass electromagnetic radiation at or near 850 nm but block electromagnetic radiation within the visible spectrum (e.g., electromagnetic radiation having wavelengths within the range from 380 nm to 750 nm). This can be done to ensure that no visible light is detected or data therefrom is acquisitioned, and thus obviate any possibility of generating personally identifiable data. In addition, portions of the casing 112 wherein the optical window 120 is not formed (e.g., the casing sides 118 and casing rear 116) can be made from a material that blocks passage of electromagnetic radiation within the visible spectrum. In at least one embodiment, the casing 112 and the optical window 120 each have a black color to both serve as blocking electromagnetic radiation within the visible spectrum and provide an inconspicuous appearance for the detection unit 102.

As noted herein, while the system 100 can have safeguards in place to ensure that sensor data 104 does not collect personally identifiable information, embodiments of the system 100 can be configured otherwise. For example, the any one or combination of the sensors 110 can be a camera that operates in the visible light spectrum. In such a case, the optical window 120 would not block electromagnetic radiation within the visible spectrum.

The detection unit 102 can have other optical components, such as lenses, waveguides, prisms, beam splitters, etc. to facilitate directing, filtering, and processing the received electromagnetic radiation coming though the optical window 120 so that the electromagnetic radiation is caused to be incident upon a desired sensor 110.

Figure 7:
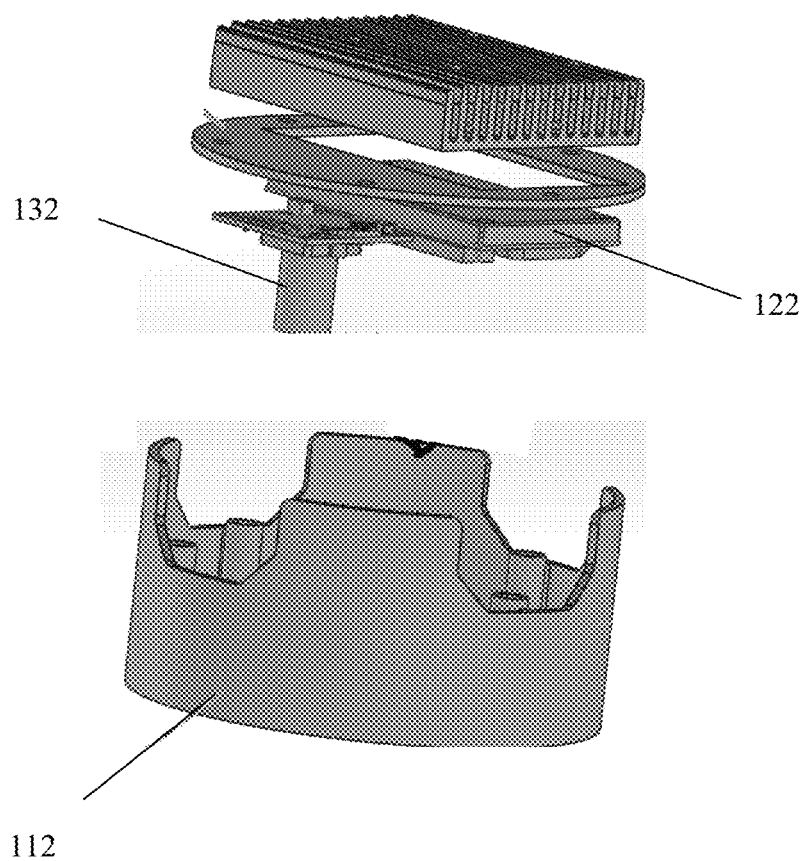
FIGS. 7 and 8 shows exploded views of exemplary embodiments of the detection unit.
Figure 8:
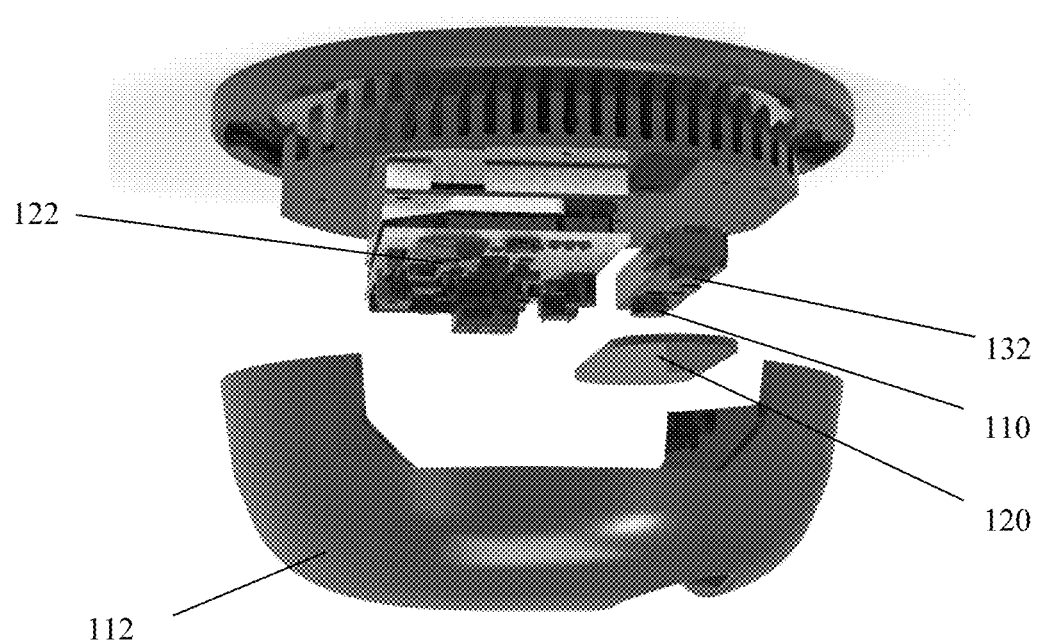
Figure 9:
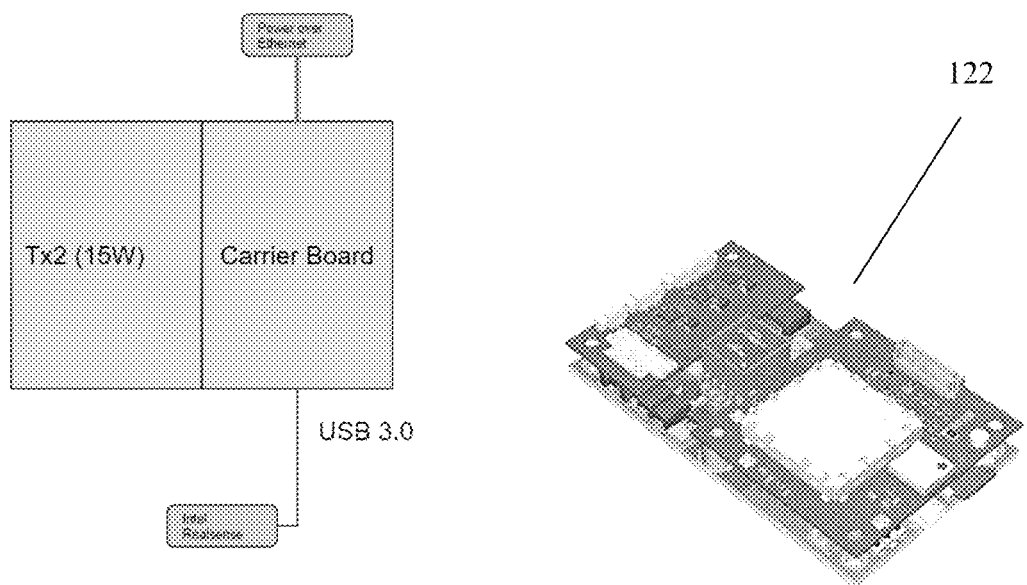
FIG. 9 shows an exemplary processor that can be used with an embodiment of the detection unit.

Referring to FIGS. 7-9, the detection unit 102 includes a processor 122. The processor 122 is operatively associated with a non-transitory, non-volatile memory. The sensor data 104, when generated, is automatically transmitted to the memory of the processor 122. The processor 122 is configured to receive the sensor data 104 (e.g., the electric current generated as a function of the electromagnetic radiation received by the sensor 110) and process the sensor data 104. Processing the sensor data 104 can include generating graphical representations, imagery, mathematical models, etc. of the environment 106 and/or objects 142 (e.g., tables, chairs, windows, individuals 108, etc.) within the environment 106. This includes generating event data 124. (See FIG. 3). Event data 124 is data representative of a predefined occurrence. For example, event data 124 can be information about where each object 142 is located in the environment 106, a statistic of the heat signatures of each object 142, a mathematical model representation of the hand placement each individual 108 in the environment 106, a mathematical model representation of the orientation of each individual 108 in the environment 106 at a specified time, etc. The processor 122 can be an integrated circuit, a central processing unit, a graphics processing unit, a field programmable gate array, a microprocessor, a core processor, etc. In at least one embodiment, the processor 122 is a graphics processing unit (GPU). With the processor 122 being a GPU and the camera 110 having an ultra wide-angle lens, the processor 122 can generate event data 124 of the environment 106 and/or objects 142 within the entire environment 106 with 4K resolution quality.

As noted herein, the system 100 can use more than one type of sensor 110. Any of the sensors 110, whether physically part of the detection unit 102 or separate from it can be in communication with the processor 122 so as to transmit sensor data 104 to the processor 122. This can be achieved via a hardwire transmission or wireless transmission (e.g., use of transceivers, gateways, etc.). The processor 122 can be configured to process the sensor data 104 from each type of sensor 110 to generate the event data 124. This can involve using sensor fusion, fuzzy logic, data curation, and/or other sensory analytics to generate the event data 124.

The sensor data 104 can be processed to generate event data 124 continuously, periodically, in accordance with a condition, and/or at the discretion of a user of the system 100. For example, the sensor data 104 may be processed only when at least one individual 108 enters the environment 106, as detected by the sensor 110.

Referring to FIG. 3, the processor 122 can be configured to generate metadata 126 of the sensor data 104. The metadata 126 can be associated with event data 124. For example, the metadata 126 can be a time-stamped transcription of an event based on the sensor data 104 collected within the time frame defined by the time-stamp. The metadata 126 can be configured to omit any personally identifying information. As explained herein, the metadata 126 is used as a report of the event so omitting any personally identifying information can be an additional safeguard to assure that no data is transmitted from the detection unit 102 that can be used to identify an individual 108 in the environment 106 (even if the detection unit 102 does collect personally identifiable information or personal information).

The processor 122 is configured to send metadata 126 to a computer device 128. This can be achieved via a hardwire transmission or wireless transmission (e.g., use of transceivers, gateways, etc.). The computer device 128 can be a mainframe computer, a server, a cloud server, a personal computer (e.g., desktop computer, laptop computer, tablet computer, etc.), etc. The computer device 128 may be operated by the massage therapy facility, a separate trustee organization (e.g., a security service, an auditing service, etc.), an authority organization (e.g., a police department, abuse reporting organization, etc.), etc.

It should be noted that any data transferred from one component of the system 100 to another component can be encrypted before being transmitted.

The detection unit 102 and/or the computer device 128 can be part of a communications network 130. Any of the detection units 102 and/or computer devices 128 includes switches, transmitters, transceivers, routers, gateways, etc. to facilitate communications via a communication protocol that facilitates controlled and coordinated signal transmission and processing. The communication links are established by communication protocols that allow the detection units 102 and/or computer devices 128 to form a communications network 130. The communications network 130 can be a long range wired or a wireless network, such as an Ethernet, telephone, Wi-Fi, Bluetooth, wireless protocol, cellular, satellite network, cloud computing network, etc. In some embodiments, the communications network 130 is configured as a predetermined network topology. This can include a mesh network topology, a point-to-point network topology, a ring (or peer-to-peer) network topology, a star (point-to-multiple) network topology, or any combination thereof.

In some embodiments, the system 100 is configured to facilitate data transmissions to and from components or other nodes within or between discrete communication networks 130. For example, the detection unit 102 can be part of a first communications network 130*a* and the computer device 128 can be part of a second communications network 130*b*. The first communications network 130*a* can have any number of detection units 102 and the second communications network 130*b* can have any number of computer devices 128. In some embodiments, any number of detection units 102 of the first communications network 130*a* is configured to communicate with another detection unit 102 of the first communications network 130*a*. Any number of computer devices 128 of the second communications network 130*b* is configured to communicate with another computer device 128 of the second communications network 130*b*.

In addition, any of the detection units 102 and/or sensors 110 can have an application programming interface (API) and/or other interfaces configured to facilitate a computer device 128 that is in communication with the detection unit 102 executing commands and controlling aspects of the detection unit 102 and/or sensor 110. This would allow the computer device 128 to control and display various operational aspects the detection unit 102 and/or sensor 110.

Figure 10:
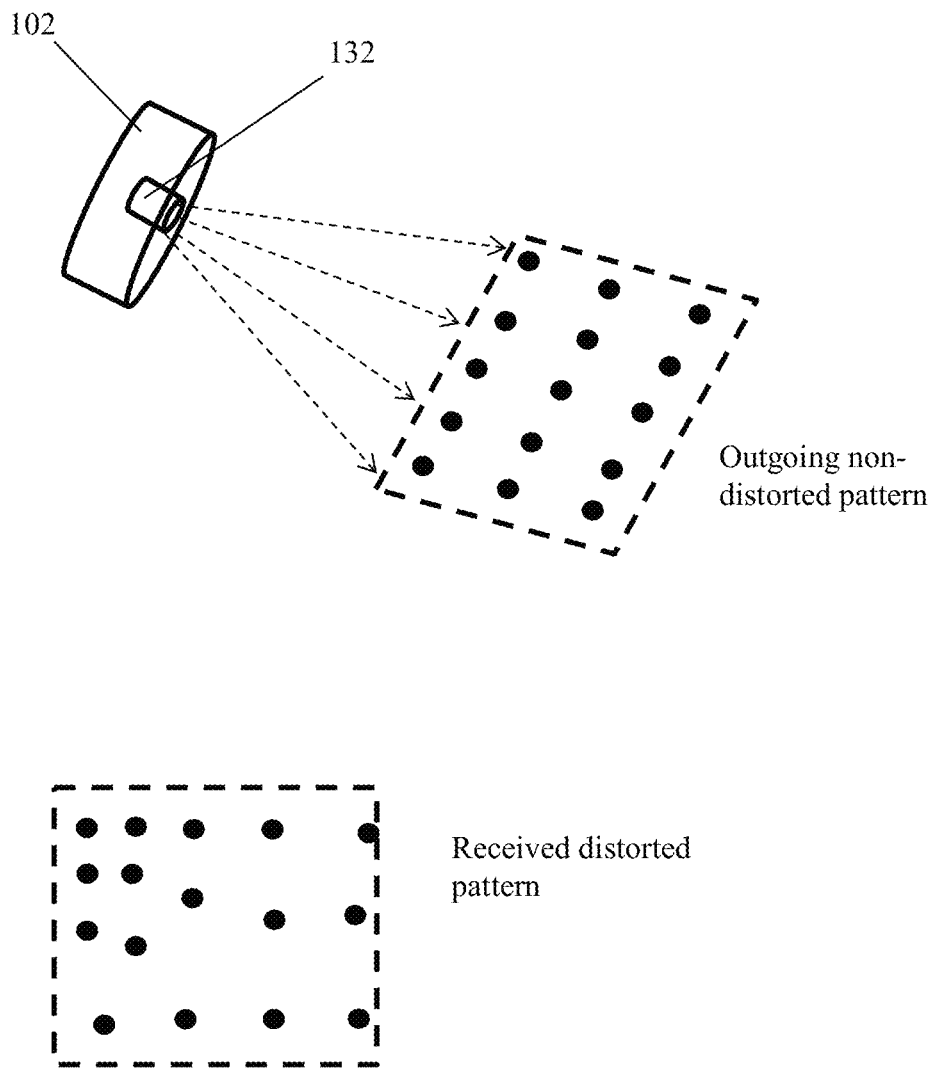
FIG. 10 shows an exemplary depth perception technique of projecting a grid into an environment that can be used with an embodiment of the system.

Referring to FIG. 10, in at least one embodiment, the processor 122 is configured to uses sensor data 104 from the infrared camera to generate a depth perception model of the environment 106. For example, the processor 122 can be programmed to project a grid into the environment 106, the grid being used as a coordinate system to identify reference points. The grid can be a matrix or pattern of infrared light beams projected by an infrared illuminator 132 of the detection unit 102. The illuminator 132 is a device configured to generate infrared light (e.g., an LED, an LED array, etc.). As the grid becomes incident on the various objects 142 in the environment 106 and is reflected back to the detection unit 102, the matrix or pattern of light beams becomes distorted (e.g., the spacing of the light beams in the pattern changes). The infrared electromagnetic radiation received by the infrared camera of the detection unit 102 includes the distortions in the pattern. These distortions can be detected by the processor 122. For example, if a first segment of the pattern of received electromagnetic radiation is more spread out in comparison to a second segment of the pattern of receive electromagnetic radiation, then that can be an indicator that an object 142 within the first segment is closer than an object 142 in the second segment. Other techniques can be used to identify depth perception. Using infrared depth perception, the system 100 determines the relative position of objects 142 within a small distance (e.g., ½ inches), allowing the system 100 to determine the dimensions and relative positions of objects 142 to a resolution of ½ inches.

Figure 11:
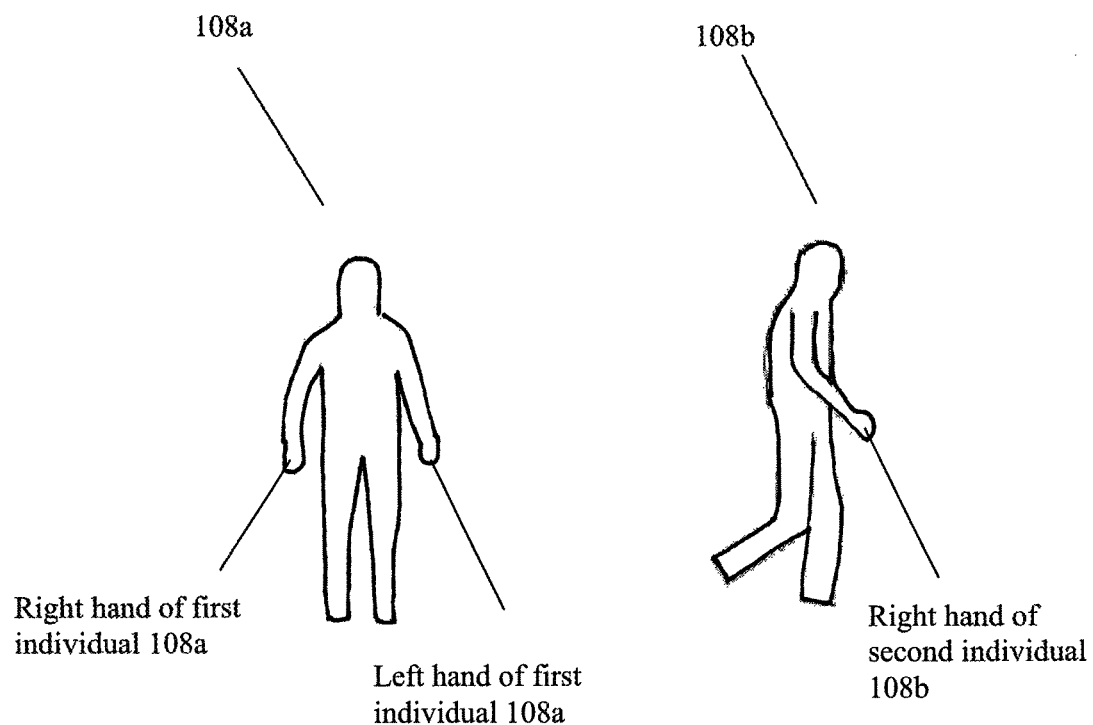
FIG. 11 shows an exemplary image or video representation of two individuals in an environment that can be generated by an embodiment of the system.

In one embodiment, the processor 122 can be programmed to identify the detection unit 102 as the center of a three-dimensional Cartesian coordinate system. (See FIG. 2). Being able to determine the relative position of objects 142 within a resolution of ½ inches, the system 100 can accurately identifying x, y, z coordinates for each object 142 or portions of object 142*s* within the inch resolution. As seen in FIG. 11, with the established coordinate system, the processor 122 can generate a graphical, image, and/or video representation of the environment 106. It is contemplated for the detection unit 102 to be attached to a central portion of a ceiling 146 of a room 106, and thus the knowledge of it generating a top-down perception of the room 106 can be used to provide an accurate three-dimensional stereo view of the environment 106 having a three-dimensional Cartesian coordinate system. Each object 142 and its movement can be recorded and tracked through the coordinate system. Object 142 recognition techniques, signal processing and filtration techniques (e.g., as Fourier transforms, Gabor transforms, etc.), mathematical modeling techniques, etc. can be done to identify and track an individual object 142, or a portion of an object 142. For example, a segment of the received pattern of light beams may be in a profile that matches that of a hand, a head, a nose, an ear, a table leg, a chair, etc. This profile is used to identify the object 142 (e.g., identify it as a hand). Once it is identified as a hand, the hand(s) of the first individual 108*a* can be tagged or otherwise associated to the first individual 108*a* by identifying characteristics of the hand(s) or body to which the hand(s) are attached so that the system 100 knows which hands are those of the first individual 108*a* and which ones are of the second individual 108*b*. These identifying characteristics can be the size or shape of the hand(s), the size or shape of the body, the posture of the body (e.g., the first individual 108*a* may be standing while the second individual is in a prone position), etc. Other association techniques can be used, such as pose estimation algorithms for example, to further facilitate tagging or associating a hand or other feature to an individual 108. The use of pose estimation algorithms will be explained later.

It should be noted that the receive profile can be used to identify other object 142*s*, such as guns, knives, etc.

Once identified, the system 100 tracks the location and movement of the object 142 or portion of the object 142. For example, the system 100 can track the location of the right hand and/or left hand of the first individual 108*a* and record each location and movement along with a time stamp associated with the recorded information. The system 100 can also track the location of the body or portion of it of the second individual 108*b* and records each location and movement along with a time stamp associated with the recorded information. The system 100 then compiles this information to generate event data 124, the event data 124 being an account of the relative locations and movements of the first individual 108a and the second individual 108b, along with a time stamp associated with the recorded information.

As noted herein, the system 100 can also be used to track the location of the right hand and/or left hand of the second individual 108b and record each location and movement along with a time stamp associated with the recorded information. The system 100 then tracks the location of the body or portion of it of the first individual 108a and records each location and movement along with a time stamp associated with the recorded information. This can be done to determine if the second individual 108b (e.g., the patient) has engaged in misconduct or reciprocated in the conduct of the first individual 108a (e.g., the massage therapist).

Figure 12:
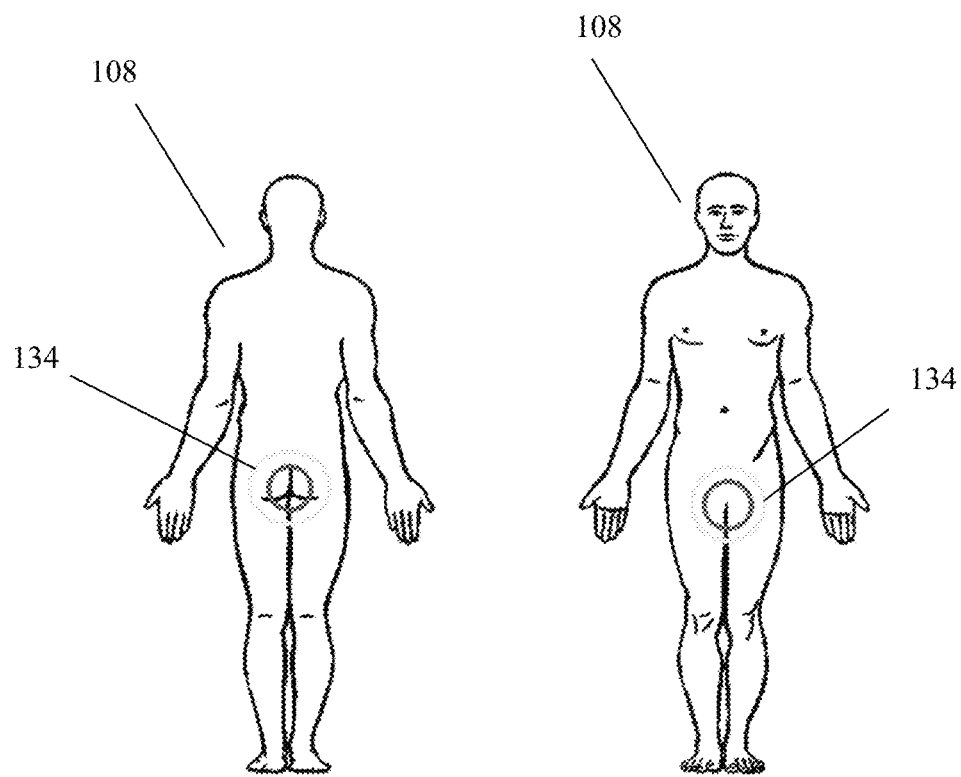
FIG. 12 illustrates an exemplary hot zone designation for an individual within the environment.
Figure 13:
FIG. 13 illustrates an exemplary pose estimation technique that can be used with an embodiment of the system.
Figure 13:

Referring to FIG. 12, the processor 122 is further configured to identify hot zones 134. A hot zone 134 is a location on the human body that is predetermined to be a sensitive area. A hot zone 134 can be the breasts or general chest area, genital or general groin area, the buttocks, etc. The system 100, being able to track the location and movement of objects 142 or portions of them to within ½ inches resolution, is able to determine if the hand of an individual 108 is within a hot zone 134. Being within a hot zone 134 can be defined as being within a predetermined distance of the hot zone 134 for a predetermine amount of time. The predetermined distance can be 1 inch, 2 inches, 3 inches, etc. The predetermined amount of time can be $\frac{1}{10}$ seconds, ½ seconds, ¾ seconds, 1 second, 5 seconds, etc.

The processor 122 is further configured to track other behaviors and gestures of the individuals 108. These can be beyond the entering the hot zone 134. For example, the processor 122 can track the head movement of the first individual 108a and/or second individual 108b and determine if the mouth of that individual came within close proximity of the other individual, regardless of the mouth entering a hot zone 134. This can be an indicator that one of the individuals kissed or has bitten the other. As another example, the processor 122 can track the hand movement of the first individual 108a and/or second individual 108b and determine if the hand has caressed a portion of the body (e.g., the shoulders, the thigh, etc.) of the other individual at a time or situation when it was not appropriate. This may be at the end of the massage, for example. Another example is if the system 100 is used in an environment where no or very little physical touching should occur between the two individuals (e.g., a dentist office), but the first individual 108a (e.g., the dentist) massages the shoulders or caresses the thigh of the second individual 108b (e.g., the patient). As another example, the system 100 can track the hand movement of the first individual 108a and/or second individual 108b and determine if the hand has hovered over a hot zone 134, regardless of the proximity of it being with the hot zone 134. This can be an indicator of sexual harassment, where the misbehaving individual does not enter the hot zone 134 but makes gestures related to conduct unbecoming for a professional environment. As another example, the system 100 can track the hand movement of the first individual 108a and/or second individual 108b and determine if the hand has entered or hovered over his or her own hot zone 134. This can be an indication that the individual 108 is engaging in sexual misconduct with himself or herself in the present of the other individual 108.

The identification and tracking of the other behaviors and gestures can be achieved via use of pose estimation algorithms configured to map model representations of an individual 108 onto the three-dimensional stereo view. The pose estimation algorithm is used to identify segments of skeletal components (e.g., it can identify up to 63 skeletal components) that best represent the movement and gestures of an individual 108. This can be done for each individual 108 in the environment 106. Identifying the segments of skeletal component allows the processor 122 to identify orientations of the joints, head, shoulders, elbows, hands, hips, knees, ankles, etc. The processor generates gesture data 136 by recording and analyzing relative positions of points associated with the skeletal components over a time period. The processor detects actions of the individuals 108 by using the gesture data 136 in mathematical action models. An action can be defined herein as a plurality of gestures. A plurality of actions can be compared with the pose of the individual 108 to detect a movement.

The identification of segments of skeletal components, the use of mathematical models of the human anatomy, and the depth perception of the infrared imagery allows the processor 122 to identify features (e.g., the ears, the eyes, the nose, the breast, etc.) of the individuals 108, as well as identify hot zones 134. This, along with artificial intelligence techniques, allows the processor 122 to determine the position and orientation of individuals 108 and their features. As noted herein, the features of an individual 108 can be tagged or otherwise associate to that individual 108 so as to facilitate tracking the location and movement of the feature. In this regard, the processor 122 can determine whether an individual 108 is standing, lying down, turning his/her head in a certain direction, etc.

Figure 14:
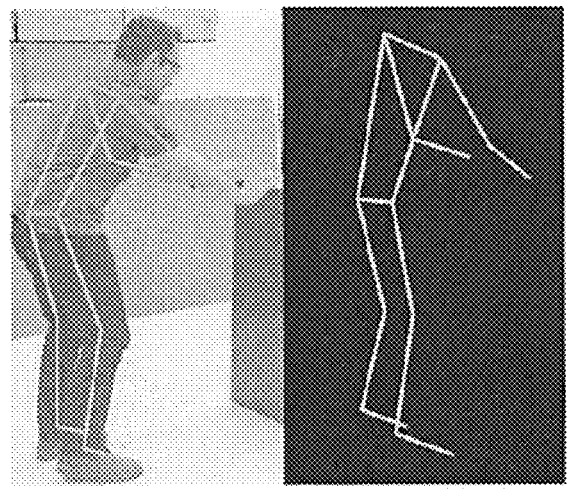
FIG. 14 illustrates an exemplary behavior model comparison technique that can be used with an embodiment of the system.
Figure 14:

Referring to FIG. 14, behavior can be determined by comparing movements to behavior models (e.g., models of expected movements for the event). This can be done using artificial intelligence techniques, machine learning techniques, deep learning, etc. For example, it is expected for a massage therapist 108a to caress portions of the patent's 108b body, but there are techniques, in the form of hand movements, that are common for treatment that should be followed. For instance, the caress should not be overly aggressive, should not be overly focused on a specific area at or near the hot zone 134, should not involve a groping or a fondling movement, etc. Some of the misconduct behavior may be subjective, but artificial intelligence techniques can be used to make inferences of behavior and provide quantifiable measures of the behavior. In this regard, the system 100 at least provides a record of an occurrence based on quantifiable measures.

Figure 15:
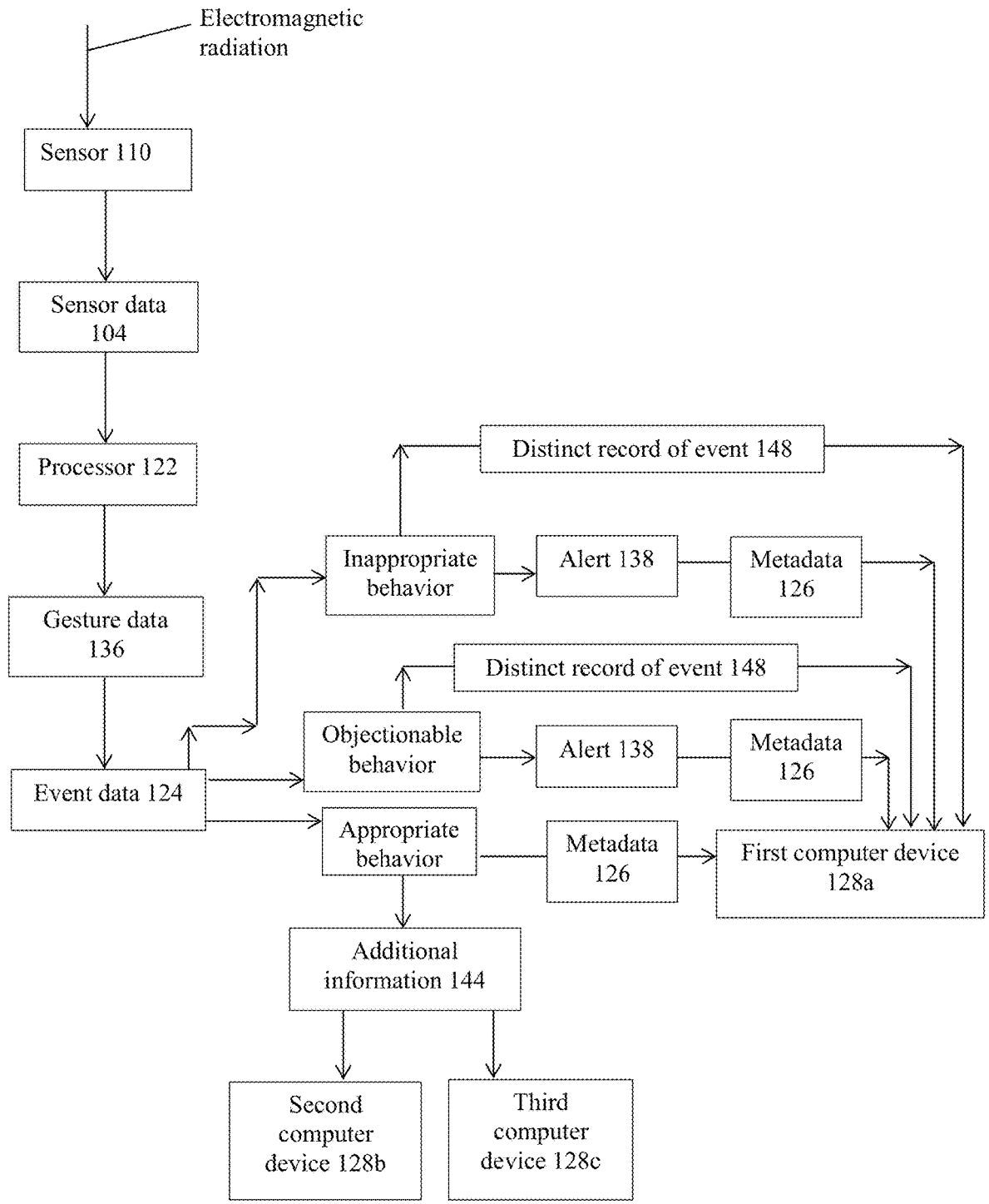
FIG. 15 shows an exemplary process flow diagram illustrating an exemplary behavior categorization technique that can be used with an embodiment of the system.

Referring to FIG. 15, the processor 122 categorizes the inferences of behavior into at least one category. The categories can include appropriate behavior, inappropriate behavior, objectionable behavior, etc. Appropriate behavior can be defined as movements, gestures, and actions that, on a whole, fall within a model behavior for the event. For example, if the event is massage therapy, the model behavior can include movements, gestures, and actions that are expected for treatment of a certain condition. This behavior model can be compared to the inference of the behavior to determine if the behavior exhibited by the individual 108 falls within the category of appropriate. Similarly, inappropriate behavior can be defined as movements, gestures, and actions that, on a whole, fall outside a model behavior for the event. Objectionable behavior can be defined as movements, gestures, and actions that, on a whole, fall within a model behavior for the event but also include some questionable inferences of behavior.

As noted herein, the processor 122 is configured to generate metadata 126 of the sensor data 104, the metadata 126 being a time-stamped transcription of an event based on the sensor data 104 collected within the time frame defined by the time-stamp. The transcription is a description of the locations, orientations, and movements of objects being tracked. Examples of metadata 126 can be:

Massage Room 2 at 1:50 PM: Second individual 108b lying face up in supine position on table; Right hand of first individual 108a moves in circular motion on right leg of second individual 108b for 9 seconds; Left hand of first individual 108a resting on table.

Massage Room 2 at 1:53 PM: Second individual 108b lying face up in supine position on table with lower torso twisted to second individual's 108 left side so that right leg of second individual crosses over left leg of second individual 108b; Right hand of first individual 108a moves from right leg of second individual 108b to buttock of second individual 108b for 3 seconds; Right hand of first individual 108a is within 2 inches of buttocks for the 3 seconds; Right of first individual 108a moves from buttock of second individual 108b to lower back of second individual 108b.

The metadata 126 can be generated continuously, periodically, in accordance with a condition, and/or at the discretion of a user of the system 100. For example, the metadata 126 may be generated only when inferences of behavior is determine to be inappropriate or objectionable. As noted herein, the sensor data 104 is transmitted to the memory of the processor 122. The processor 122 can acquisition the sensor data 104 at any time to generate the metadata 126. Thus metadata 126 can be generated in real time or at any time (at the discretion of the user) as long as the sensor data 104 is saved.

In one embodiment, the system 100 is configured to generate alerts 138. An alert 138 can be a communication (e.g., email, an SMS text, instant message, a phone call, textual or graphical display in a user interface of a computer, etc.) regarding an event. The alert 138 is generated automatically based on the event being an inferred behavior that is deemed inappropriate or objectionable. As with other signals transmitted by the system 100 being able to be encrypted, the alert 138 can also be encrypted. The alert 138 may include metadata 126 of the event. In addition, once an alert 138 is generated, the processor 122 can be configured to generate a distinct record of the event 148, as well as events preceding and following the event. For example, if an event is inferred to include inappropriate behavior and/or objectionable behavior, the system 100 acquisitions the sensor data 104 related to the first and second individuals 108 for a 12-hour period before and a 12-hour period after that event and generates a recording of all the sensor data 104 related to the individuals 108 within the 24-hour time period as part of the distinct record of the event 148. The sensor data 104 is then used to generate metadata 126 for each minute (or some other time frame) of the 24-hour time period in which events involving the first individual 108a and second individual 108b are detected. In some embodiments, the sensor data 104 can also be used to generate a video representation in infrared imagery of the 24-hour time period in which events involving the first individual 108a and second individual 108b are detected as part of the distinct record of the event 148.

It should be noted that the processor 122 is configured to perform the heavy computations and data analytics for the system 100. Only transcription information and metadata 126 information, and in some cases a distinct record of an event 148 (which may include a video representation in infrared imagery), is transmitted to the computer device 128 for additional processing and storage. This allows the majority of the data to be processed on-site via the algorithms programmed into the processor 122. This can obviate the need to establish a fast connection via the communications network 130 that would otherwise be needed if the computations were performed by the computer device 128. In addition, by having the processing done at the processor 122, the system 100 ensures that sensor data 104 and metadata 126 of the events are generated, regardless of the operability of the communications network 130 (e.g., regardless of having an internet connection or a fast internet connection). Moreover, the on-board processing can facilitate configuring compatibility of the system 100 software with a user's software or computer system.

As noted herein, the metadata 126 is used as a report of events. The metadata 126 is transmitted to the computer device 128 in an alert 138 form or just as a transcription of the event. While embodiments of the system 100 can be used to identify and track misconduct, the system 100 can also be used to generate additional information 144. The additional information 144 can be related to job performance. For example, the metadata 126 can include information about the quality of the massage, the proper technique and hand placement of the massage therapist 108a to treat a condition, the proper placement and positioning of the patient 108b, etc. Thus, metadata 126 can be used for training purposes, used as a quantitative measure of work performance, used as an interactive means to communicate complex and subjective issues to a patient 108b, etc.

Figure 16:
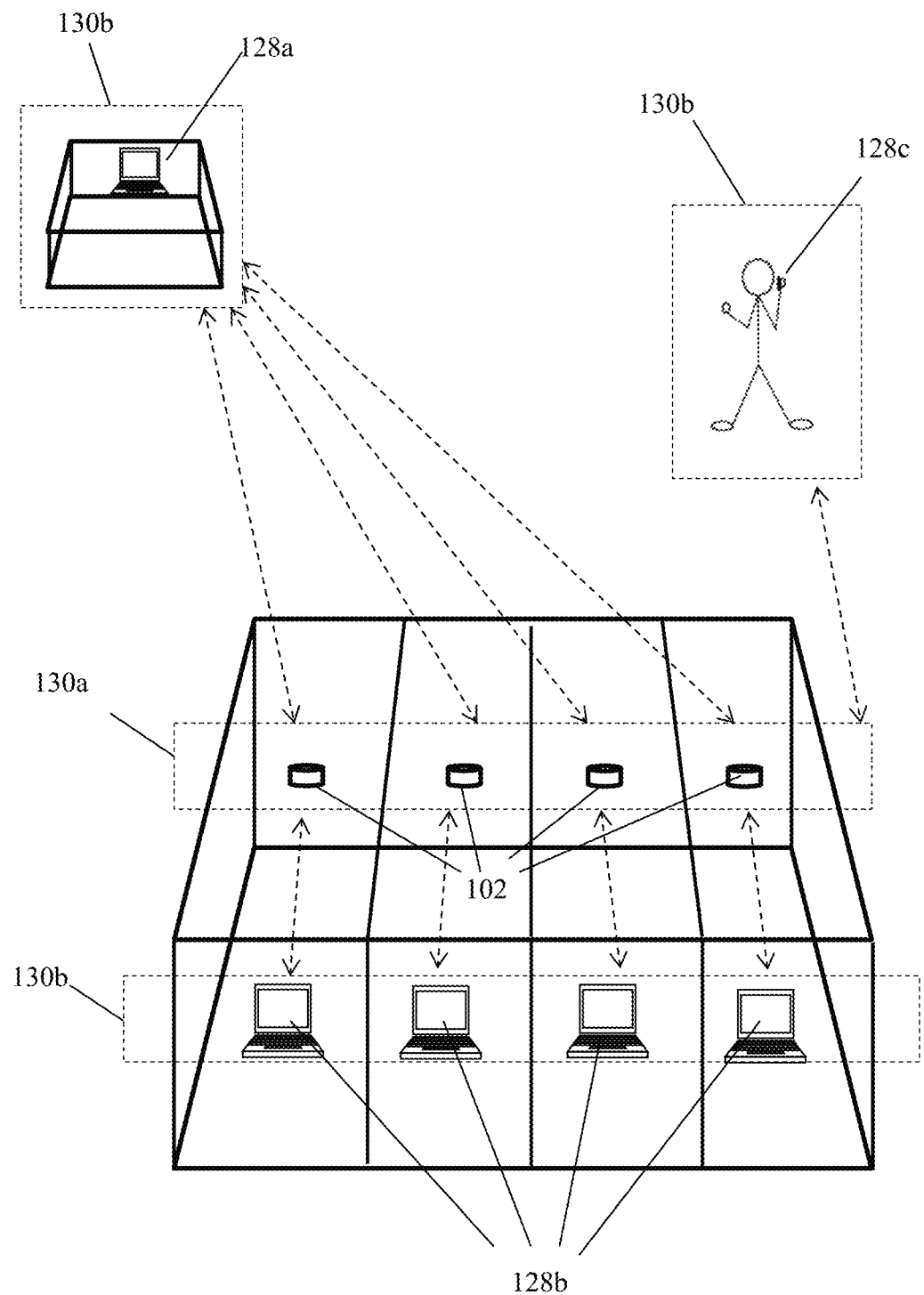
FIG. 16 shows an exemplary use of an embodiment of the system having a plurality of detection units.

The system 100 can be configured to generate at least one user interface (UI) 140. (See FIG. 3). The UI 140 can be displayed on the computer device 128. As noted herein, the system 100 can have more than one computer device 128. Referring to FIG. 16, a first computer device 128a can be used by the system 100 to receive alerts 138, metadata 126, records of events, etc. The first computer device 128a can be used by management of the massage therapy facility. A second computer device 128b can be used to receive the additional information 144. The second computer device 128b can be used by the massage therapist 108a and/or patient 108b of the massage therapy facility. The first computer device 128a can be configured to generate a first UI 140a and the second computer device 128b can be configured to generate a second UI 140b.

It is contemplated for the first UI 140a to be configured to record and display alerts 138, metadata 126, and records of events, as well as facilitate adjustment of operating parameters for the system 100. For example, the first UI 140a provides a screen display on the first computer device 128a that displays the alerts 138, metadata 126, and records of events received for each room 106 or therapist 108a of a massage therapy facility. In addition, the first UI 140a provides control modules via the first computer device 128a that allow a user to adjust the frequency with which sensor data 104 or metadata 126 is collected, the type of sensor data 104 collected, the conditions associated with generating alerts 138, the parameters defining appropriate, inappropriate, and objectionable behavior, the transcript used for the metadata 126, the type of analytics used to process the sensor data 104, etc. For example, the first computer device 128a can transmit command signals entered via the first UI 140a to the processor 122 and/or sensors 110 via a hardwire transmission or wireless transmission (e.g., use of transceivers, gateways, etc.).

It is contemplated for the second UI 140b to be configured to receive and process the additional information 144. For example, the additional information 144 can be processed by the second computer device 128b to provide quantitative information about the quality of the massage, the proper technique and hand placement of the massage therapist 108a to treat a condition, the proper placement and positioning of the patient 108b, etc. For example, the infrared electromagnetic radiation received from the patient 108b can be used to identify knots and/or other physiological conditions. These are superimposed on a representative image of the patient 108b and displayed on the second computer device 128b via the second UI 140b for the massage therapist 108a and/or the patient 108b to view. This can assist the massage therapist 108a in communicating the problem areas to be addressed and in determining the correct or best massage therapy to use.

In addition, the second UI 140b can generate a before, during, and/or after representative image of the patient 108b that illustrates the knots and/or other physiological conditions so as to provide a quantitative measure of the quality of the massage. This can be augmented by comparing differential heat exchange data of the patient's 108b body taken before and after the massage to provide a measure of how relaxed the patient 108b is before, during, and/or after the massage. In addition, patient 108b survey information can be used to further augment this analysis. These measures can be used to improve or enhance client interaction, adjust massage therapy frequency and/or techniques, facilitate proper matching between therapist and patient, etc.

In addition, the second UI 140b can be used to generate performance analytics of the therapist 108a for management review. For example, the data and measures identified above are used to assess how well the therapist 108a is following proper techniques, how well the therapist is addressing the needs of patients 108b, if the therapist's 108a performance is improving or degrading, etc.

Some embodiments can include a third computer device 128c configured to generate a third UI 140c. The third computer device 128c can be a personal computer device 128 (e.g., a smartphone) of the patient 108b. The third UI 140c can be implemented via application software (i.e., an "app"). The third UI 140c is configured to provide a record of the massages the patient 108b receives from the massage therapy facility, a record the massages the patient 108b receives from an individual therapist 108a, a record of statistics representative of the quality of massage, etc. The third UI 140c can also be used to receive other data (e.g., data from a diet app, an activity app, a fitness band, etc.) and display this information in conjunction with the massage information.

Any of the displays in any of the UIs 140 can be in textual, tabular, and/or graphical format.

In a non-limiting, exemplary implementation of the system 100, the detection unit 102 is attached to a central location of a ceiling 146 in a room 106. The detection unit 102 has an infrared camera as the sensor 110 and is configured to operate at or near 850 nm. The infrared camera has an ultra wide-angle lens configured to receive electromagnetic radiation from a wide panoramic or hemispherical field of view of the room 106. The detection unit 102 is configured to collect sensor data 104 that is non-identifiable to individuals 108 that may enter in the room 106.

The detection unit 102 includes a casing 112 housing the infrared camera 110, a processor 122, and an illuminator 132. The casing has an optical window 120 formed in a portion thereof through which the illuminator 132 emits electromagnetic radiation having a wavelength within the infrared spectrum and through which electromagnetic radiation having a wavelength within the infrared spectrum is received into the detection unit 102 by the camera 110.

The infrared camera 110 generates sensor data 104 and transmits it to the processor 122. The processor 122 uses the sensor data to generate a depth perception model of the room 106 by projecting an infrared light grid into the room 106 via the illuminator 132. The processor 122 is programmed to identify the detection unit 102 as the center of a three-dimensional Cartesian coordinate system. The processor 122 uses the sensor data 104, the depth perception model, and the three-dimensional Cartesian coordinate system to generate a graphical, image, and/or video representation of the room 106. Features of individuals 108 are identified and tagged or associated with the individual 108. For example, hands or other features of a first individual 108a are identified and tagged or associated with the first individual 108a. Hands or other features of a second individual 108b are identified and tagged or associated with the second individual 108b. In addition, hot zones 134 of individuals 108 are identified and monitored.

The processor 122 records and tracks each object 142 (including features of an individual 108) and their movement within the room 106 through the coordinate system. The processor 122 also tracks behaviors and gestures of the individuals 108. The processor 122 identifies behaviors by comparing movements to behavior models (e.g., models of expected movements for the event). The processor 122 categorizes inferences of behavior into at least one category, which can include appropriate behavior, inappropriate behavior, and objectionable behavior.

The processor 122 processes the sensor data 104 to generate event data 124. The processor 122 also generates metadata 126 based on the sensor data 104. The metadata 126 is associated with event data 124 by being a time-stamped transcription of an event based on the sensor data 104 collected within the time frame defined by the time-stamp. The metadata 126 is configured to omit any personally identifying information of individuals 108 that may enter the room 106. The processor 122 sends metadata 126 to a computer device 128.

The processor 122 generates alerts 138 based on the event being an inferred behavior that is deemed inappropriate and/or objectionable. Once an alert 138 is generated, the processor 122 generates a distinct record of the event 148 (which includes events preceding and following the event). In some embodiments, the processor 122 generates a video representation in infrared imagery as part of the distinct record of the event 148.

It should be understood that the disclosure of a range of values is a disclosure of every numerical value within that range, including the end points. It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof.

It should be understood that modifications to the embodiments disclosed herein can be made to meet a particular set of design criteria. For instance, any of the detection units 102, processors 122, sensors 110, computer devices 128, communications networks 130, and/or other components of the system 100 can be any suitable number or type of each to meet a particular objective. Therefore, while certain exemplary embodiments of the system 100 and methods of using the same disclosed herein have been discussed and illustrated, it is to be distinctly understood that the invention is not limited thereto but may be otherwise variously embodied and practiced within the scope of the following claims.

What is claimed is:

1. A detection unit, comprising:
    an illuminator configured to generate first electromagnetic radiation within the infrared spectrum and project the first electromagnetic radiation onto a first individual and a second individual within a environment;
    a sensor configured to:
        receive the first electromagnetic radiation reflected from the first individual and the second individual;
        receive second electromagnetic radiation, the second electromagnetic radiation being emitted from the first individual and the second individual;
        generate sensor data from the received first electromagnetic radiation and received second electromagnetic radiation;
    a processor configured to:
        receive the sensor data and generate a depth perception model of the environment;
        identify a feature of the second individual as a hot zone defined as a sensitive area of the second individual's body;
        generate event data and gesture data to track location, orientation, and movement of the first individual and the second individual so as to monitor gestures of the first individual with respect to the hot zone of the second individual;
        identify a behavior of the first individual based on the event data and the gesture data;
        compare the behavior of the first individual to a behavior model, the behavior model including models of expected movements for events;
        generate an inference, via artificial intelligence techniques, to categorize the behavior, the processor categorizing the behavior as:
            appropriate behavior defined as:
                the inference of behavior, as a whole, falling within the behavior model; and
                the gesture data having no indication of the hot zone of the second individual being entered by the first individual;
            objectionable behavior defined as:
                the inference of behavior, as a whole, falling within the behavior model but having some gesture data that falls outside of the behavior model; and
                the gesture data having an indication of the hot zone of the second individual being entered by the first individual; or
            inappropriate behavior defined as:
                the inference of behavior, as a whole, falling outside of the behavior model; and
                the gesture data having an indication of the hot zone of the second individual being entered by the first individual;
        identify at least one inference as an event; and
        generate metadata and associate the metadata to the event, the metadata being a time-stamped transcription of the event.

2. The detection unit recited in claim 1, wherein the processor configures the metadata to exclude from the transcription any information that personally identifies the first individual and/or the second individual.

3. The detection unit recited in claim 1, wherein the processor categorizes the behavior as:
    appropriate behavior defined as the inference of behavior, as a whole, falling within the behavior model;
    objectionable behavior defined as the inference of behavior, as a whole, falling within the behavior model but having some gesture data that falls outside of the behavior model; or
    inappropriate behavior defined as the inference of behavior, as a whole, falling outside of the behavior model.

4. The detection unit recited in claim 3, wherein the processor is configured to generate an alert for objectionable behavior and an alert for inappropriate behavior.

5. The detection unit recited in claim 4, wherein the alert for objectionable behavior comprises a communication transmitted by the processor and the alert for inappropriate behavior comprises a communication transmitted by the processor.

6. The detection unit recited in claim 3, wherein the processor is configured to generate a distinct record of event for objectionable behavior and a distinct record of event for inappropriate behavior.

7. The detection unit recited in claim 3, wherein the processor is configured to generate additional information related to the appropriate behavior.

8. The detection unit recited in claim 1, wherein:
    the feature of the second individual comprises at least one of a hand, an arm, a leg, a stomach, a chest, a back, a buttock, and a face.

9. The detection unit recited in claim 1, comprising a casing configured to house the illuminator, the sensor, and the processor.

10. The detection unit recited in claim 9, wherein:
    the casing comprises a casing front, casing sides, and a casing rear;
    the casing has a disc or puck shape; and
    the casing front has an optical window configured to allow for transmission of the first electromagnetic radiation and the second electromagnetic radiation, but to block at least some electromagnetic radiation outside of the infrared spectrum.

11. The detection unit recited in claim 1, wherein the sensor comprises an infrared camera.

12. The detection unit recited in claim 1, wherein the sensor comprises a plurality of sensors.

13. A surveillance system, comprising:
    a detection unit, comprising:
        an illuminator configured to generate first electromagnetic radiation within the infrared spectrum and project the first electromagnetic radiation onto a first individual and a second individual;
        a sensor configured to:

receive the first electromagnetic radiation reflected from the first individual and the second individual;
receive second electromagnetic radiation, the second electromagnetic radiation being emitted from the first individual and the second individual;
generate sensor data from the received first electromagnetic radiation and received second electromagnetic radiation;
a processor configured to:
receive the sensor data and generate a depth perception model of the environment;
identify a feature of the second individual as a hot zone defined as a sensitive area of the second individual's body;
generate event data and gesture data to track location, orientation, and movement of the first individual and the second individual so as to monitor gestures of the first individual with respect to the hot zone of the second individual;
identify a behavior of the first individual based on the event data and the gesture data;
compare the behavior of the first individual to a behavior model, the behavior model including models of expected movements for events;
generate an inference, via artificial intelligence techniques, to categorize the behavior, the processor categorizing the behavior as:
appropriate behavior defined as:
the inference of behavior, as a whole, falling within the behavior model; and
the gesture data having no indication of the hot zone of the second individual being entered by the first individual;
objectionable behavior defined as:
the inference of behavior, as a whole, falling within the behavior model but having some gesture data that falls outside of the behavior model; and
the gesture data having an indication of the hot zone of the second individual being entered by the first individual; or
inappropriate behavior defined as:
the inference of behavior, as a whole, falling outside of the behavior model; and
the gesture data having an indication of the hot zone of the second individual being entered by the first individual;
identify at least one inference as an event;
generate metadata and associate the metadata to the event, the metadata being a time-stamped transcription of the event;
generate an alert based on the categorized behavior;
a computer device configured to receive the metadata and the alert.

14. The surveillance system recited in claim 1, wherein the processor is configured to:
identify a feature of the first individual as a hot zone defined as a sensitive area of the first individual's body;
identify a behavior of the second individual based on the event data and the gesture data;
compare the behavior of the second individual to a behavior model, the behavior model including models of expected movements for events;
generate an inference, via artificial intelligence techniques, to categorize the behavior, identify at least one inference as an event; and
generate metadata and associate the metadata to the event, the metadata being a time-stamped transcription of the event.

15. The surveillance system recited in claim 13, wherein the processor is configured to:
identify a feature of the first individual as a hot zone defined as a sensitive area of the first individual's body;
identify a behavior of the second individual based on the event data and the gesture data;
compare the behavior of the second individual to a behavior model, the behavior model including models of expected movements for events;
generate an inference, via artificial intelligence techniques, to categorize the behavior, identify at least one inference as an event; and
generate metadata and associate the metadata to the event, the metadata being a time-stamped transcription of the event.

16. A method for surveillance, the method comprising:
generating first electromagnetic radiation within the infrared spectrum and projecting the first electromagnetic radiation onto a first individual and a second individual within an environment;
receiving the first electromagnetic radiation reflected from the first individual and the second individual;
receiving second electromagnetic radiation, the second electromagnetic radiation being emitted from the first individual and the second individual;
generating environment data from the received first electromagnetic radiation and received second electromagnetic radiation;
generating a depth perception model of the environment based on the environment data;
identifying a feature of the second individual as a hot zone defined as a sensitive area of the second individual's body;
generating event data and gesture data to track location, orientation, and movement of the first individual and the second individual so as to monitor gestures of the first individual with respect to the hot zone of the second individual;
identifying a behavior of the first individual based on the event data and the gesture data;
comparing the behavior of the first individual to a behavior model, the behavior model including models of expected movements for events;
generating an inference to categorize the behavior, the behavior being categorized as:
appropriate behavior defined as:
the inference of behavior, as a whole, falling within the behavior model; and
the gesture data having no indication of the hot zone of the second individual being entered by the first individual;
objectionable behavior defined as:
the inference of behavior, as a whole, falling within the behavior model but having some gesture data that falls outside of the behavior model; and
the gesture data having an indication of the hot zone of the second individual being entered by the first individual; or
inappropriate behavior defined as:
the inference of behavior, as a whole, falling outside of the behavior model; and
the gesture data having an indication of the hot zone of the second individual being entered by the first individual;
identifying at least one inference as an event; and generating metadata and associating the metadata to the event, the metadata being a time-stamped transcription of the event.

* * * * *